Figure 1:
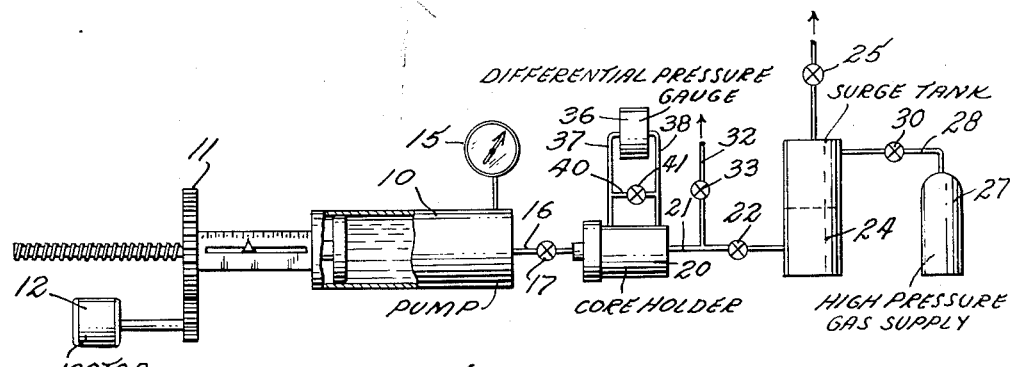

March 13, 1956  G. HERZOG ET AL  2,737,804

RELATIVE PERMEABILITY MEASUREMENTS

Filed June 13, 1951

INVENTORS
GERHARD HERZOG AND
KARL C. TENBRINK

BY

ATTORNEYS

United States Patent Office 2,737,804
Patented Mar. 13, 1956

2,737,804

RELATIVE PERMEABILITY MEASUREMENTS

Gerhard Herzog and Karl C. Ten Brink, Houston, Tex., assignors to The Texas Company, New York, N. Y., a corporation of Delaware Application June 13, 1951, Serial No. 231,433

13 Claims. (Cl. 73—38)

The present invention is concerned with the permeability of porous solids and more specifically relates to the quantitative measurement of the relative or effective permeability of porous subsurface oil bearing formations or reservoir materials.

The invention, therefore, has particular application to the determination of fluid flow characteristics in porous subsurface hydrocarbon producing formations or reservoirs containing heterogeneous fluid systems such as oil, capillary water and frequently gas for the purpose of evaluating said reservoirs and maximizing production.

The term "effective permeability" as used herein concerns the permeability of the porous solid formation to flow of a single fluid, such as oil, in a heterogeneous fluid system involving the presence of one or more additional fluid phases, such as water. This contrasts with "specific permeability" which comprehends permeability of the formation to a single fluid, in a single phase, homogeneous fluid system. The term "relative permeability" means the ratio of the effective permeability to the permeability of the porous material with respect to the same liquid at complete fluid saturation, or in other words, the ratio of the effective to the specific permeability.

In accordance with the present invention, the effective permeability of a porous core sample with respect to the desired fluid in a heterogeneous fluid system comprising an accompanying or additional fluid phase or phases, is determined by immobilizing the accompanying phase and thereafter measuring the permeability to a discrete flow of fluid through the residual pore space. To this end the accompanying phase may be introduced into the sample as a fluent immobilizable liquid, which is caused to distribute itself through the core sample to effect a predetermined partial saturation or permeation of the pore space, and thereafter is immobilized in situ.

As a result, the residual free portion of the pore space corresponds to the space normally occupied by the fluid with respect to which effective permeability is to be determined. Determination of such permeability therefore follows from simple measurement of flow capacity as a stream of the desired phase forced through the sample under a suitable, predetermined pressure drop. By virtue of the immobility of the non-flowing phase or phases, no shift in relative saturation takes place and the flowing phase, under measurement, can be forced through the sample at any convenient rate of flow to enable expeditious and accurate determinations.

In accordance with the present invention the immobilizable phase may be a substance which readily distributes as a fluid in the internal pore space of the porous sample, and possesses wetting properties equivalent to those of the non-flowing or accompanying phase in the heterogeneous system to be simulated and measured. The term "wetting properties" as used herein with regard to the immobilizable phase, refers exclusively to whether the substance is wetting or non-wetting with respect to the surfaces of the porous solid, and without regard to the magnitude of the wetting or non-wetting characteristics, as the case may be.

For example, in contact with a clean dry core sample, molten petroleum wax is an ideal wetting phase liquid, while a fluent low melting alloy such as Wood's metal, is non-wetting. On the other hand the fluent wax becomes non-wetting when the surfaces of the sample are previously wet by water.

As above intimated, in the case of permeability measurements with respect to samples of porous sub-surface strata of a petroleum reservoir, the fluid system normally comprises liquid petroleum, formation water and frequently a fluid phase of gas. Typically, the connate formation water preferentially wets the formation surfaces and rises by capillary action through the minute interstices, thereby, to this extent, displacing the non-wetting petroleum hydrocarbons. Its location and disposition in the pores of the formation is determined by this property of preferentially wetting the solid surfaces of the formation, and thus it is selectively disposed in the recesses and crevices in a pattern determined by its interfacial properties with respect to the solid surfaces and also the non-wetting phase.

The liquid petroleum, on the other hand, exists in the system as a non-wetting phase which is excluded from the water wet capillaries by the preferential encroachment of capillary formation water. It is therefore restricted to the residual and larger pore spaces according to the pattern determined by the liquid wetting phase.

The gas phase, where present, displaces oil in the largest pores.

Therefore to determine relative permeability with respect to a non-wetting phase in the presence of a wetting phase, the pore space of the core sample is caused to absorb a quantity of a liquid wetting phase equal to a predetermined part of the actual pore volume, the liquid wetting phase is thereafter immobilized in situ, and flow conditions measured through the residual space. The flowing phase employed in determination may be any convenient fluid such as a gas, which will form a discrete flow through the residual pore space. Alternatively it may be a liquid having wetting properties corresponding to those of the flowing phase in the system simulated.

On the other hand in determining relative permeability to the wetting phase in such a system, it is contemplated impregnating the internal pore space of the sample to the desired extent with a non-wetting liquid which thereafter is immobilized and the flow through the residual pore space measured. Any convenient gas or wetting liquid is then passed under controlled flow conditions through the residual space normally occupied by the wetting phase to yield the permeability data. Ordinary permeability determination with suitable fluids passing through the unoccupied pore space, therefore, represents permeability of the porous sample with respect to the flowing fluid, in the presence of the accompanying heterogeneous phase. By making the determination at various phase saturations, the entire range of effective permeabilities is observed.

Figure 2:
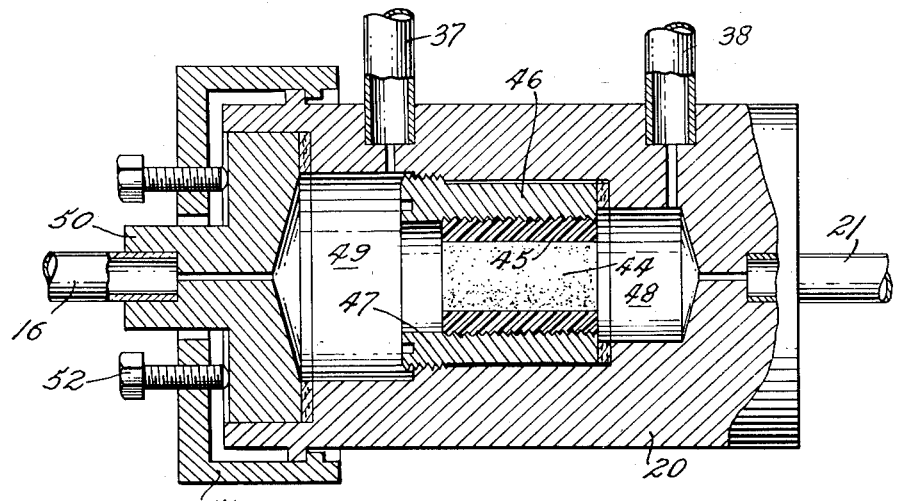

The present invention may be carried out in the apparatus disclosed more or less diagrammatically in the accompanying drawing wherein Fig. 1 is a somewhat schematic diagram of the test system and Fig. 2 is a sectional view of the sample chamber or core holder employed therein.

Referring to Fig. 1 of the drawing, the reference numeral 10 represents a positive displacement pump calibrated to register the quantity of liquid displaced thereby. The pump 10 is driven through a gear train 11 by a motor 12. Advantageously the motor 12 is of the adjustable-constant speed type to permit continual displacement of the liquid being pumped at any selected rate of flow.

Pressure gauge 15 indicates the pressure at the pump discharge. The pumped liquid flows from pump 10 through conduit 16 controlled by valve 1 to core holder 20 which contains the core sample undergoing test. The outlet of the core holder is in fluid communication via conduit 21 and valve 22 with a surge tank 24 provided with an adjustable pressure release valve 25.

For the purpose of mounting the core holder under high pressure during the test, if such should be desired, means are provided for setting up a back pressure in surge tank 24. These means comprise a high pressure gas source 27, which may be a high presure nitrogen cylinder, in communication via conduit 28 and regulating valve 30 with the upper end of surge tank 24.

Conduit 32 controlled by valve 33 extends from conduit 21 to a vacuum pump, not shown, to permit evacuation of the core sample prior to test. A differential pressure gauge is indicated by reference numeral 36, pressure gauge 36 being connected to the inlet and outlet of the core holder through pipes 37 and 38, respectively. The differential pressure gauge registers a pressure drop through the porous core sample during the flow of a fluid therethrough. A by-pass line 40 controlled by a valve 41 connects the conduits 37 and 38.

Fig. 2 illustrates the mounting of the core sample 44 for test. Usually the core is a cylindrical sample cut from a subsurface petroleum-producing formation and mounted in a plastic sleeve 45 within a mounting cylinder 46 which is clamped within the core holder 20 by means of ring 47. The opposite axial extremities of the core communicate respectively with outlet chamber 48 and inlet chamber 49 in the core holder. A cover 50 is gasketed and placed in the inlet end of the holder by means of a bayonet type cap 51 provided with clamping screws 52.

Exemplary of the practice of this invention with respect to determining the permeability of a porous medium, containing a non-wetting liquid phase, to a wetting liquid phase, wherein the internal pore space of the core sample is impregnated to a desired extent with a non-wetting liquid phase which is thereafter immobilized and flow of the wetting liquid phase through the residual pore space is measured, the core holder containing the core sample undergoing test is evacuated via opened valves 33, 41 and 17, valve 22 being closed. Thereafter pump 10 is set in motion to flood the chamber on both sides of the core sample with a low melting point alloy which is non-wetting with respect to the core sample undergoing test, that is, to flood the chamber at substantially atmospheric pressure on both sides of the core sample. The pump gradually builds up pressure ultimately reaching a level wherein it commences to positively force the non-wetting low melting point alloy into the internal pore space of the core sample. The actual amount of liquid alloy thus injected into the core sample is directly readable from the calibrated pump and is the volume of liquid alloy displaced by the pump after initial and complete flooding of the core holder with the liquid alloy.

After the injection of the liquid alloy into the core to the desired extent of partial saturation the thus-injected liquid alloy is immobilized therein by freezing by suitable means, such as by subjecting the core holder by localized freezing so as to selectively freeze the alloy injected within the core sample. After the core sample has been thus frozen the liquid alloy remaining in the core holder is removed and a liquid wetting phase, such as water or brine, is pumped or caused to flow through the core sample containing the immobilized non-wetting alloy phase. The amount of wetting phase displaced through the core sample and the pressure drop required to maintain given rate of flow of wetting liquid phase through the thus-treated core sample are indicated by pump 10 and gauge 38, respectively.

In the case of the three phase fluid system, the non-wetting liquid may be distributed through the internal pores at reduced degrees of saturation to simulate the static condition of the gas phase and permit effective permeability determination of residual pore space corresponding to the wetting and/or non-wetting phases. For example, relative permeability of the formation with respect to a non-wetting phase in the presence of a capillary wetting phase and a gas phase may be simulated by first effecting the desired degree of saturation of the sample with an immobilized wetting phase, as above, and thereafter partially saturating the residual free pore volume to a predetermined extent with a non-wetting phase which is likewise immobilized. The rsidual pore volume, therefore, corresponds to space occupied by the non-wetting liquid hydrocarbon phase through which permeability is readily determinable by the usual means.

As above intimated, the immobilizable materials which can be caused to permeate the sample as a liquid phase and thereafter set up under convenient conditions include waxes which are solid at ordinary temperatures but which are fluid at moderately elevated temperatures. Petroleum or paraffin wax is particularly advantageous from the standpoint that it does not wet a preferentially water wet formation, but nevertheless readily wets dry formation surfaces of a dry core sample. Therefore, a fluid paraffin wax acts in contact with a previously cleaned and dried formation sample the same as naturally occurring formation water. Therefore, at normal temperatures the wax solidifies to a relatively rigid state within the normally water bearing capillaries.

As is also intimated above, such waxes are likewise suited to simulation of an immobilized non-wetting phase when the formation surfaces are previously wet with water. In short, the paraffin forms respectively a wetting or non-wetting phase in the formation dependent upon the absence or presence of liquid water.

Other effective non-wetting phase liquids comprise the class of low melting point alloys which are solid at ordinary temperatures but melt slightly thereabove. These alloys form a well-known class which, per se, forms no part of the present invention and therefore requires no detailed description. Usually, however, they contain bismuth, cadmium, lead and tin in various proportions and sometimes indium and/or mercury.

As further examples of liquid wetting phase materials setting to a condition of relative immobility or rigidity at reasonable temperatures, are the settable fluids, the gel forming liquids and cements, as, for example, gelatine.

From the foregoing it is apparent that the utility of the immobilizable phase is dependent essentially upon the physical properties which enable absorption by the core sample in the fluid condition followed by controlled freezing or immobilization in situ. In addition, its wetting properties with respect to the formation surfaces, that is whether wetting or non-wetting as the case may be, determine the nature of the flow through the residual free space of the pores.

Preferably the immobilizable phase is fluid at moderate temperatures not substantially in excess of about 212° F. in order to avoid adversely affecting the surfaces of the sample. For instance, at temperatures substantially above 212° F. the water of hydration or of crystallization inherent in many formation surfaces may tend to be driven off. Hence this and similar undesired alterations of the sample are advantageously avoided by use of saturants which are fluid at temperatures below about 300° F.

Preferably also, the injected phase becomes substantially immobile at temperatures in the range of about 50–100° F. at which the required measurements can be conveniently made. Therefore, where immobility depends upon a freezing point or range, solidification temperatures in the range of about, for example 50–200° F. are desirable, preferably ordinary room temperatures in the range about 50–100° F.

The present invention for the first time, insofar as we are aware, enables rapid and accurate quantitative determination of relative permeability data in regard to porous solids and particularly petroleum reservoir subsurface formations. In currently proposed methods, the several heterogeneous fluid phases are mobile. Therefore, the flowing phase with respect to which permeability is being determined tends to radically influence the distribution of the other phases in the system. For example, in the determination of effective oil flow in the presence of capillary water, the flowing oil phase tends to cause a high water saturation at the outlet end of the sample and a low saturation at the inlet end. This effect is manifestly fatal to accuracy and can only be avoided by tedious procedures which are costly and time consuming. In direct contrast, determination of effective relative permeability in the presence of an immobile accompanying phase involves only relatively simple, direct flow measurement.

Following is an example of a permeability determination with respect to a non-wetting phase fluid in the presence of a wetting phase at a predetermined condition of partial saturation. A clean, dry core sample preferably preheated to about 230° F. is placed in a chamber which is evacuated to a low pressure, as for example about $10^{-3}$ mm. mercury, to abstract air from the interstices. A solution of paraffin in heptane at about 122–140° F. is then admitted to the chamber until the core is covered with the solution. Since the core was initially dry the solution wets the surfaces and spontaneously enters the pore spaces. As a result of the previous evacuation, the core becomes completely saturated with the wetting solution.

Pressure in the chamber is permitted to rise to atmospheric pressure and excess solution is wiped from the core surface. The core is then placed in a drying oven over night at a temperature as, for example about 230° F. to selectively vaporize and drive off the heptane and allow the melted paraffin, in predetermined ratio to the total pore space, to distribute itself as a liquid phase therethrough.

After the heptane has been driven off, the core is removed from the drying oven, allowed to come to room temperature and, preferably, checked as to weight in order to confirm the actual volume of solid paraffin in the core. Thereafter, at room temperature, any suitable fluid, such as nitrogen gas, is passed through the core sample to determine the effective permeability at the particular wetting phase saturation of the core sample thus prepared.

The permeability in Darcy's fluid flow measurement is determined in accordance with the equation of fluid flow as follows:

$$Q = \frac{kA(P_1 - P_2)}{\mu L}$$

where Q is the volume rate of flow thru the sample, $k$ is the permeability in Darcy's, A and L are respectively, the cross sectional area and length of the sample in the direction of flow, $(P_1 - P_2)$ the pressure drop thru the sample, and $\mu$ is the viscosity of the flowing fluid.

From the foregoing example, it will be seen that the relative paraffin saturation of the porous sample, that is to say, the proportion of the total internal pore space occupied by the wetting phase, is determined by the relative concentration of paraffin in the paraffin-heptane solution. In other words, complete saturation of the sample by a solution comprising equal parts of paraffin and solvent results in a 50 per cent saturation of the material by paraffin. Thus the extent of paraffin saturation always approximates its concentration in the injected solution. In this way, the extent of paraffin saturation of the pore space can be varied at will throughout the entire range to enable determination of effective permeability of the residual, unoccupied pore space at any desired ratio of wetting/non-wetting phase relationship.

The same pore sample may be repeatedly employed for permeability determination at widely different wetting phase saturations by extracting the paraffin with an organic solvent e. g. benzene, and repeating the foregoing procedure with some different concentration of wax solvent.

In determining effective permeability with respect to a wetting phase fluid in the presence of a non-wetting phase, the dry core sample is advantageously saturated 100% with synthetic formation water, and thereafter subjected to air pressure in a conventional air-water capillary cell to displace a portion of the water and reduce the water saturation to the desired value. The partially water-saturated core sample is placed in an alloy injection unit and surrounded with a low melting point alloy having a melting point of 117° F. The temperature of the core sample is raised to 130° F. to insure complete fluidity and an external pressure imposed upon the hot alloy by means of a volumetric displacement pump.

The pressure imposed on the fluid metal is sufficient to force the alloy into the pore space not occupied by water. Manifestly, the water, being incompressible, restricts the injected alloy to the residual pore spaces to assure saturation of this residual space. Ordinarily a pressure about 600 p. s. i. is sufficient for this purpose.

Temperature of the core is allowed to drop to room temperature under the aforesaid injection pressure. The core sample, surrounded by an excess of the solid alloy, is removed from the injection unit, machined to suitable diameter, and faced off at its axial extremities to allow flow longitudinally therethrough. Thereafter, a fluid such as synthetic formation water is passed axially through the core sample to determine effective permeability to the wetting phase at the prevailing water saturation.

In this sample, effective permeability data over the complete saturation range may be conveniently determined in steps of decreasing water saturation. That is to say, starting at the highest desired water saturation, a determination is made as above. Thereafter, the water saturation is again reduced in an air-water capillary cell, the sample again repotted in the alloy injection unit with additional alloy, cooled, machined and treated as above, repeating this procedure throughout the entire range.

In place of the procedure in the example immediately above, the alloy injection may be effected directly by injecting the liquid metal into a dry core sample at gradually increasing applied pressures until the desired degree of partial saturation results. Since the amount of metal thus injected varies with the applied pressure any predetermined partial saturation may be realized by means of a volumetric alloy injection pump by which the external pressure is increased in small increments and the absorption of the alloy in the pore spaces observed simultaneously, as the amount of metal displaced by the pump.

This procedure has the advantage that the non-wetting phase saturation may readily be readjusted to any desired value in repeating the different degrees of saturation.

Moreover, proceeding in this manner, it is readily possible to check the extent of liquid metal absorption by comparing the weight of the sample to its non-injected weight. Manifestly, if the sample is carefully machined to the same dimensions after each subsequent injection, the increase in weight represents the amount of metal absorbed. Alternatively, the extent of unoccupied voids after potting may be easily determined by saturating the residual pores with water and determining the increase.

As above intimated paraffin may be substituted for the liquid metal if the core sample is first injected with water, as above, to water wet the internal solid surfaces which thereupon become non-wetting to paraffin. This procedure has the advantage that the paraffin is readily removable by extraction leaving the sample available for continued study.

Moreover, in lieu of injecting the paraffin into a dry core to simulate the wetting phase, other methods of impregnation will readily occur to those skilled in the art in view of the above example. Thus, instead of supplying the paraffin in solution in a solvent, a predetermined amount of liquid paraffin may advantageously be placed in contact with the sample at an elevated temperature such that the liquid is uniformly absorbed and distributed by capillary action. Thereafter the paraffin is permitted to freeze and the permeability of the residual space determined. The weight of the sample before and after paraffin addition may be used to confirm the amount absorbed.

The determination of effective permeability in a three-phase fluid system follows from the principles disclosed above. For example, in a typical three-phase petroleum reservoir, the water occupies the smallest pores, the oil the intermediate pores, and the gas the largest pores. Therefore, to determine effective permeability with respect to the non-wetting liquid phase in the presence of a gas phase and a wetting phase, a wetting fluid, paraffin, may be caused to permeate the dry sample to the desired extent, as above, and cooled to freezing temperature. Thereafter, a fluid, low melting alloy, with a melting point somewhat lower than the paraffin, is introduced under pressure and at a temperature at which the paraffin remains solid, to fill a portion of the residual pore volume equal to that of the gas in the system under study. It is to be noted that the metal alloy, being non-wetting, will first occupy the largest regions of the residual pore space, and therefore the voids in the three-phase system which are normally occupied by the gaseous phase.

The low melting point alloy is permitted to freeze, preferably at about room temperature, to result in a partially saturated core sample in which the frozen paraffin simulates the fluid wetting phase, the solid metal simulates the gas phase, and the residual volume corresponds to and simulates the space normally occupied by the non-wetting liquid phase, as, for example, an oil phase in a subsurface reservoir. Therefore, a core prepared in this manner can be immediately measured, with respect to oil permeability in conventional permeability apparatus at the predetermined wetting (paraffin) and gas (alloy) saturation. As above intimated, this determination may advantageously be made with a flow of gas simulating the oil phase in order to facilitate and expedite the measurement of the flow characteristics.

In the determination of effective permeability to gas in a three-phase system, as above, the dry core is injected with a wetting fluid, such as paraffin, to an extent corresponding to the sum of the saturations of oil and water in the system. For example, if effective gas permeability is to be determined for a system comprising 40% water and 35% oil and 25% gas, then the core sample is prepared by freezing in 75% of the total pore volume with paraffin as a wetting phase. The permeability of the residual space, therefore, reflects true permeability to the corresponding gas phase in the presence of the accompanying simulated oil and water phases.

Similarly, the effective permeability for water in a three-phase system is obtainable by freezing in an alloy, as above, in an amount corresponding to the sum of the pore spaces normally occupied by gas and oil. Thus, in the above system, the core is 60% saturated with the alloy, which is permitted to freeze, and then the ordinary permeability determination for water is carried out, as described above.

Among the wide field of immobilizable liquid phase materials which may be employed are liquids containing ferromagnetic substances which set up in a magnetic field. For example, a magnetically settable oil employed as a nonwetting phase may be maintained in the solidified condition under a magnetic field during the test. Moreover, two such discrete fluid phases may be used simultaneously, preferably so selected that one solidifies at a magnetic field strength at which the other is still liquid, making it possible to manipulate the two fluids independently.

Obviously, many modifications and variations of the invention as hereinbefore set forth may be made without departing from the spirit and scope thereof, and therefore, only such limitations should be imposed as are indicated in the appended claims.

We claim:

1. The method for determining permeability of a porous solid material to a flowing phase in a heterogeneous fluid system involving at least one, discrete accompanying phase which comprises introducing an amount equal to a predetermined portion of said pore space of said accompanying phase as a fluid into the internal pore space of a dry, clean sample of said porous solid material, rendering said accompanying phase immobile in situ, setting up a substantial rate of flow of said flowing phase through the residual pore space of said porous material and determining the effective permeability to said flowing phase.

2. The method according to claim 1 wherein said flowing phase is a gas.

3. The method according to claim 1 wherein the flowing phase is a liquid which is non-wetting with respect to the solid surfaces of said porous material.

4. The method according to claim 1 wherein the accompanying phase immobilized in the porous, solid material is non-wetting with respect to said solid surfaces of said porous material.

5. The method for determination of effective permeability of a solid, porous material to a flowing phase in a heterogeneous, fluid system involving at least one, discrete, accompanying phase which comprises injecting into a dry, clean sample of the porous material a fluent immobilizable liquid having wetting properties equivalent to those of the accompanying phase in the desired system and in a quantity effective to saturate a predetermined portion of the internal porous space within said solid material, thereafter rendering said liquid phase immobile, setting up a substantial rate of flow of a discrete fluid through the residual porous space in said solid material and determining the effective permeability to said flowing phase.

6. The method for determination of effective permeability of a solid, porous material to a flowing phase in a heterogeneous, fluid system involving at least one, discrete, accompanying phase which comprises partially saturating a dry, clean sample of said porous material with a fluent, immobilizable liquid phase material in an amount equivalent to a predetermined portion of the total internal pore space of said material, immobilizing said liquid within the pore space of said sample at a temperature in the range of about 50–200° F., setting up a flow of discrete fluid through the residual, unoccupied pore spaces of the sample and determining the relative permeability of the sample to flow through the residual pore space.

7. The method according to claim 6 wherein the immobilizable liquid phase material is wetting with respect to the surfaces of the said porous material.

8. The method according to claim 6 wherein the immobilizable liquid phase material is non-wetting with respect to the surfaces of the said porous material.

9. The method according to claim 6 wherein the immobilizable liquid phase material is a paraffin wax.

10. The method according to claim 6 wherein the immobilizable liquid phase material is a low melting point alloy which freezes substantially above room temperature.

11. The method for determining effective permeability of a solid porous material to a single fluid phase in a heterogeneous fluid system including discrete phases which are respectively wetting and non-wetting with regard to the surfaces of said solid porous material, which comprises partially saturating a dry, clean sample of the porous material with a fluent immobilizable liquid phase material equal in amount to a predetermined portion of the internal pore space of said porous material, freezing the immobilizable liquid phase material and determining the permeability of the residual pore space.

12. The method for determining effective permeability of a solid porous material to a single fluid phase in a heterogeneous fluid system including discrete phases which are respectively wetting and non-wetting with regard to the surfaces of said solid porous material which comprises partially saturating a dry, clean sample of the porous solid with a fluent immobilizable liquid phase material which is wetting with respect to the porous material and equal in amount to a predetermined portion of the internal pore space of said porous material, immobilizing the immobilizable liquid phase material in situ and determining the permeability of the residual pore space.

13. The method for determining effective permeability of a solid porous material to a single fluid phase in a heterogeneous fluid system including discrete phases which are respectively wetting and non-wetting with regard to the surfaces of said solid porous material, which comprises partially saturating a dry, clean sample of the porous solid with a fluent immobilizable liquid phase material which is non-wetting with respect to the porous material and equal in amount to a predetermined portion of the internal pore space of said porous material, immobilizing the liquid phase material in situ, and determining the permeability of the residual pore space.

References Cited in the file of this patent

UNITED STATES PATENTS

| | | |
|---|---|---|
| 2,293,488 | Bays | Aug. 18, 1942 |
| 2,345,935 | Hassler | Apr. 4, 1944 |
| 2,604,779 | Purcell | July 29, 1952 |
| 2,662,401 | Bailly | Dec. 15, 1953 |
| 2,693,104 | Welge | Nov. 2, 1954 |